United States Patent [19]

Cook

[11] Patent Number: 4,697,871

[45] Date of Patent: Oct. 6, 1987

[54] TERMINATION OF OPTICAL FIBERS

[75] Inventor: John S. Cook, Rumson, N.J.

[73] Assignee: Dorran Photonics Incorporated, Atlantic Highlands, N.J.

[21] Appl. No.: 737,779

[22] Filed: May 28, 1985

[51] Int. Cl.[4] .............................................. G02B 6/38
[52] U.S. Cl. ................................ 350/96.21; 350/96.20
[58] Field of Search ................ 350/96.20, 96.21, 96.22

[56] References Cited

U.S. PATENT DOCUMENTS

| 4,167,303 | 9/1979 | Bowen et al. | 350/96.21 |
| 4,236,787 | 12/1980 | Iacono et al. | 350/96.21 |
| 4,458,983 | 7/1984 | Roberts | 350/96.20 |
| 4,515,433 | 5/1985 | Schmidt | 350/96.21 |

OTHER PUBLICATIONS

Harper et al, "Fiber-Optic Connector", *IBM Tech. Disclosure Bulletin*, vol. 21, No. 5, Oct. 1978, pp. 2115-2116.

*Primary Examiner*—John Lee
*Attorney, Agent, or Firm*—Robin, Blecker & Daley

[57] ABSTRACT

An optical fiber connector has a housing including an axially extending passage with an exterior opening of first diameter and an interior opening of second diameter less than the first diameter and a frustro-conical wall bounding the passage and extending between the exterior and interior openings. The wall has an axial slot extending therethrough of axial extent equal to or less than the passage and extending axially across the interior opening. A separate biasing member may be included. The housing is thus equipped with selective radial expansibility for facilitating seating therein of an optical fiber plug having a frustro-conical exterior surface and an optical fiber centrally interiorly thereof.

34 Claims, 17 Drawing Figures

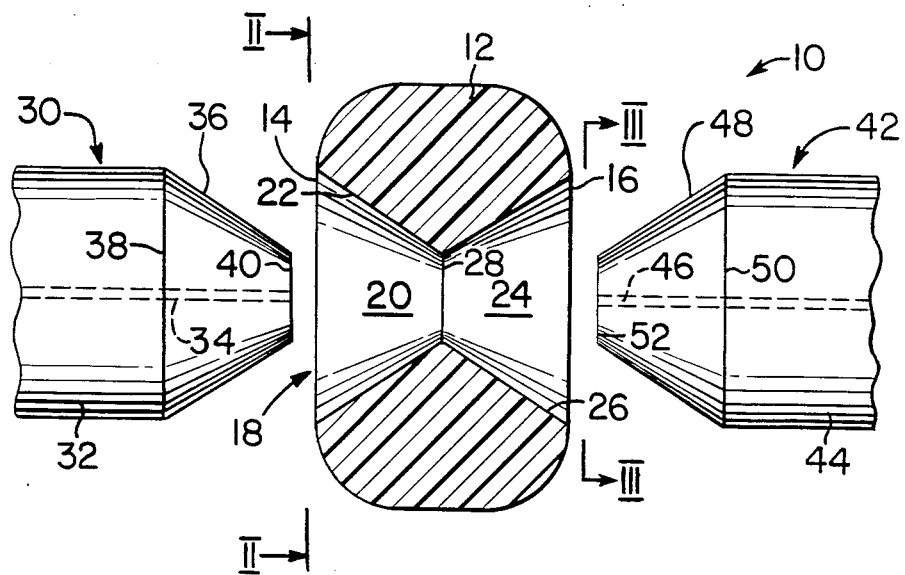
FIG. 1
(PRIOR ART)
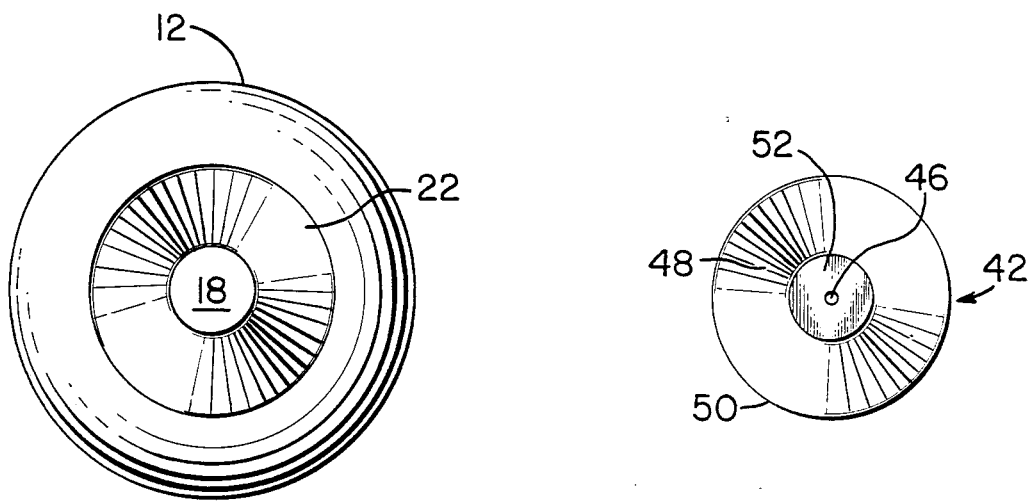
FIG. 2
(PRIOR ART)
FIG. 3
(PRIOR ART)

4,697,871

TERMINATION OF OPTICAL FIBERS

FIELD OF THE INVENTION

This invention relates generally to optical fiber connection and pertains particularly to the termination of optical fibers supported in housings molded thereon.

BACKGROUND OF THE INVENTION

In one present commercial optical fiber connection practice, an optical fiber has a generally frustro-conical housing or plug applied thereto by molding technique, and a receptor housing or sleeve is fabricated with a frusto-conical passage extending axially therein and adapted for receipt of the fiber so housed and for disposition of the fiber end face in registry with an optic connection interface in the passage. The sleeve defines a companion such passage extending oppositely from the optic connection interface, whereby the sleeve is adapted for receipt of a second so housed fiber to connect two such fibers by disposing their respective end faces in registered contact at the sleeve connection interface. This optical fiber connection practice and apparatus thereof and connectors resulting therefrom are seen in a patent series including U.S. Pat. No. 4,107,242 to P. K. Runge, U.S. Pat. No. 4,264,128 to W. C. Young, and U.S. Pat. No. 4,432,604 to R. E. Schwab, all such patents being assigned to Bell Telephone Laboratories, Incorporated and incorporated herein by this reference thereto.

Single mode optical fiber connection practice, such as is attained by the foregoing, imposes critical fiber end face relation as contrasted with the lesser constraints of multimode optical fiber connection. Thus, in the single mode situation, no fiber end face spacing or separation is tolerable, i.e., the end faces of two fibers being connected must be in mutual physical contact. Further, concentricity is paramount. In typical instance, the clad fiber may be one hundred and twenty five microns in diameter, with the fiber core at five microns diameter and coaxial with the cladding. If the respective cores are misaligned concentrically by more than one-half micron, the connection does not meet desired single mode specifications and is to be rejected in quality control.

In the experience of the assignee of the present invention, in its licensed practice under the above referenced patents, various factors have been observed which lead to connectors produced and not within the noted demanding specifications. Thus, given the close dimensional tolerances as against such variables as mold matter density, curing time, collective curing of products molded successively at different times, temperature and humidity, etc., only selective ones of many produced connectors pass quality control. Typical rejection of products at the quality control stage arises from dimensional mismatch as between the sleeve frustro-conical surface and that of the fiber housing, whereby the end of the fiber housing so interferes with the frustro-conical surface of the sleeve as to abut same and have its axial movement arrested at a location spaced from the desired mutual contact interface.

SUMMARY OF THE INVENTION

The present invention has as its primary object improved yield of optical fiber connectors of the above discussed type meeting the specified single mode operational requirements.

A more particular object of the invention is the provision of sleeve structure which enhances fiber end face physical contact and fiber-to-fiber alignment.

The invention also looks to improved methods for optical fiber termination.

In attaining the foregoing and other objects, the invention introduces into the sleeve set forth in the above-referenced patents an adaptive capability for effecting disposition of fiber end faces precisely at the sleeve connection interface, despite the presence in the fiber housing and/or sleeve frustro-conical surfaces of out-of-tolerance dimensions which would give rise to quality control rejection of such connector if it were to incorporate the sleeve structure of the referenced patents, i.e., in the absence of such adaptive capability. In compensating for sleeve material relaxation and the like with time and usage, the invention includes biasing means for opposing such adaptive capability.

Such capability is achieved, in preferred practice and structure under the invention, by rendering the sleeve selectively radially expansible in its frustro-conical surface in manner permitting axial movement of the fiber housing in the sleeve, beyond that provided in the prior art sleeve, such that the fiber end face can be disposed at the sleeve connection interface, despite such interference between the fiber housing and sleeve frustro-conical surfaces as would preclude such end face disposition in the absence of such radial expansibility. The noted biasing means is, in this instance, of type opposing radial expansibility of the sleeve.

In the several embodiments below discussed, the sleeve radial expansibility is provided by introducing a discontinuity in the frustro-conical surface of the sleeve. Such discontinuity may be in the form of a slot extending partially axially of the sleeve, opening into the frustro-conical surface and encompassing the sleeve connection interface. In this instance, the biasing means will comprise sleeve continuous portions adjacent the slot. The slot may also extend fully axially of the sleeve, in which case, the biasing means may be structurally distinct from the sleeve and disposed either within or external to the sleeve for applying radially inwardly directed force to the sleeve. Such separate biasing means may also be employed with the partially extending slot.

The foregoing and other objects and features of the invention will be further understood from the following detailed description of preferred embodiments and practices and from the drawings, wherein like reference numerals identify like parts throughout.

DESCRIPTION OF THE DRAWINGS

FIG. 1 is a central sectional view of the prior art sleeve with left and right fiber plugs spaced from the sleeve along the sleeve axis.

FIG. 2 is a reduced scale elevation of the sleeve of FIG. 1 as would be seen from plane II—II of FIG. 1.

FIG. 3 is a reduced scale elevation of the right fiber plug of FIG. 1 as would be seen from plane III—III of FIG. 1.

DESCRIPTION OF THE PREFERRED EMBODIMENTS AND PRACTICES

Figure 4:
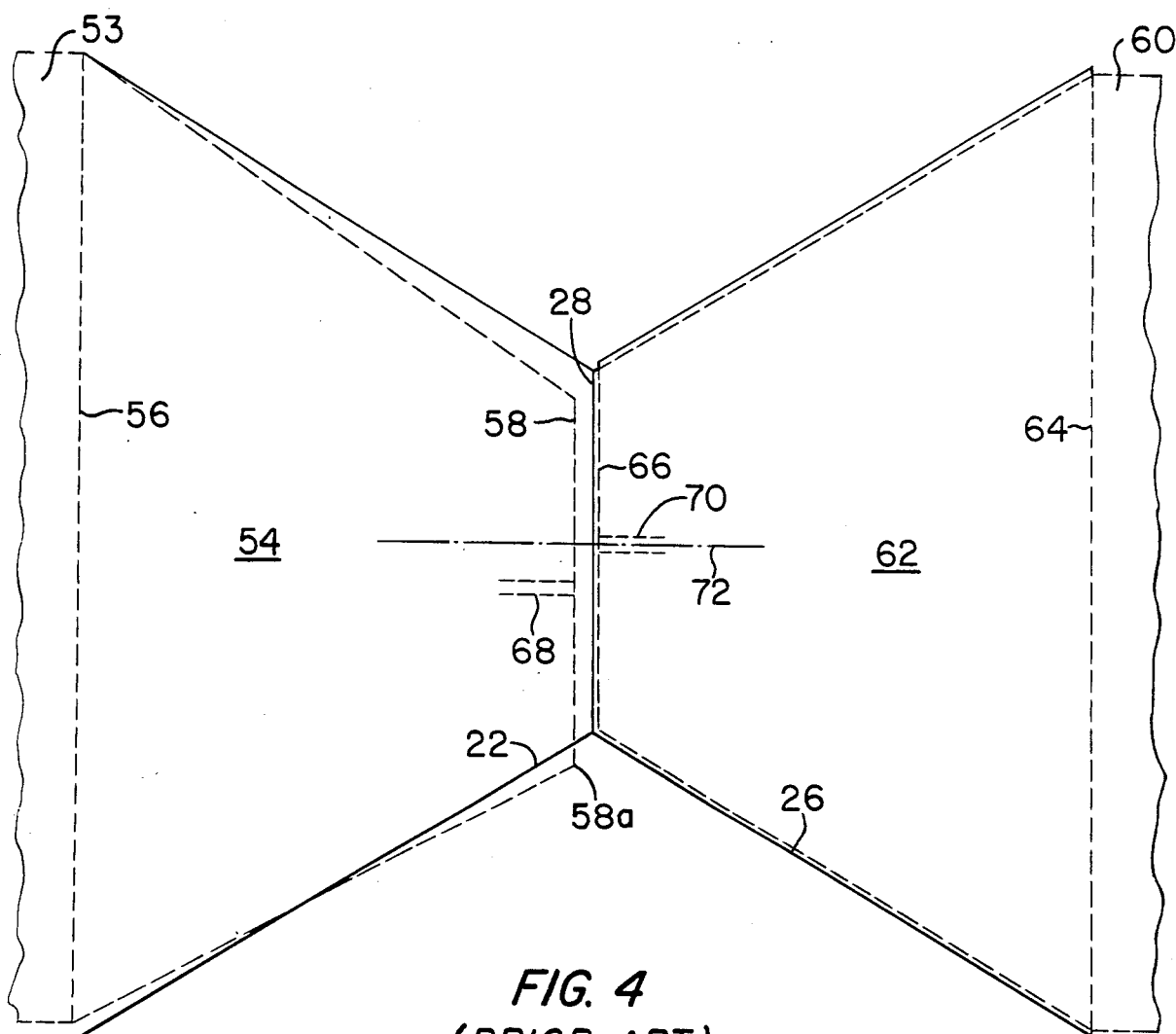
FIG. 4 is an enlarged schematic showing of FIG. 1 with a dimensionally out-of-tolerance left fiber plug and a dimensionally in-tolerance right fiber plug seated in the sleeve.

Referring to FIGS. 1-3, optical fiber connector 10 of the prior art referred to above includes sleeve 12 having leftward and rightward openings 14 and 16 of first diameter into axial passage 18. Passage 18 includes a leftward portion 20 bounded by frustro-conical surface 22 and a rightward portion 24 bounded by frustro-conical surface 26. Surfaces 22 and 26 intersect at interior opening 28 of sleeve 12, same being of second diameter which is less than the first diameter, i.e., of exterior openings 14 and 16, and constitutes a fiber connection interface. Sleeve 12 is typically a molded plastic body.

Leftward fiber plug 30 includes a plastic housing 32 molded about optical fiber 34. Housing 32 has frustro-conical surface 36 extending between its location 38 and plug end 40, respectively of the above-mentioned first and second diameters.

Rightward fiber plug 42 includes a plastic housing 44 molded about optical fiber 46. Housing 44 has frustro-conical surface 48 extending between its location 50 and plug end 52, respectively of the above-mentioned first and second diameters.

The first called-out diameter, that of openings 14 and 16 and of locations 38 and 50 of plugs 30 and 42, is greater than the second called-out diameter, that of opening 28 and of ends 40 and 52 of plugs 30 and 42.

Turning to FIG. 4, plug 53 is depicted with an out-of-tolerance housing, not residing in sleeve frustro-conical surface as per specifications. Thus, frustro-conical surface 54 of plug 53 is configured such that its larger end 56 so interferes with surface 22 that margin 58a of end 58 cuts or digs into surface 22, arresting movement of end 58 into registry with sleve interface 28.

The prior art connector of FIG. 4 is out-of-specification clearly since physical contact does not occur as between ends 58 and 66 of plugs 53 and 60 and fibers 68 and 70 are not mutually concentrically registered along sleeve axis 72.

Figure 5:
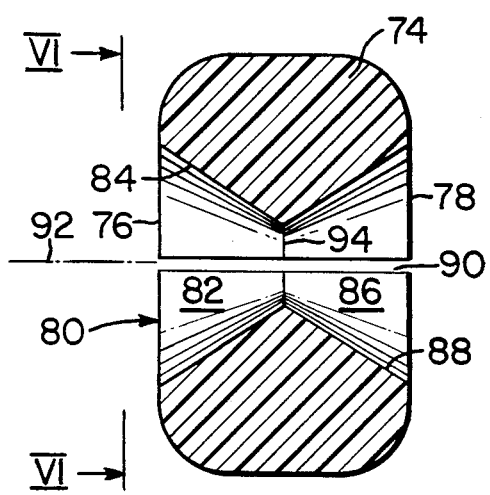
FIG. 5 is a central sectional view of a sleeve structure having a fully extending slot without separate bias as would be seen from plane V—V of FIG. 6.
Figure 6:
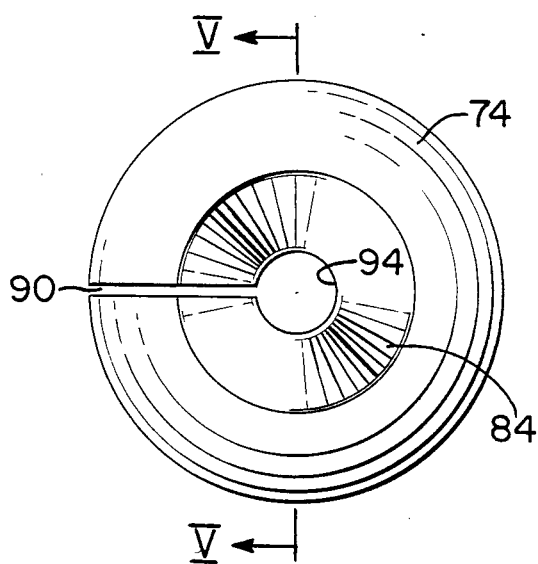
FIG. 6 is an elevation of the sleeve of FIG. 5 as would be seen from plane VI—VI of FIG. 5.

For correction of the situation applying in FIG. 4, sleeve 74 of FIGS. 5 and 6 includes first exterior openings 76 and 78 into axial passage 80, having leftward portion 82 bounded by frustro-conical surface 84 and rightward portion 86 bounded by frustro-conical surface 88. Surfaces 84 and 88 jointly define axial discontinuity 90, extending fully along sleeve 74 axis 92, and encompassing interface 94 of sleeve 74, which is coextensive with the interior ends of sleeve portions 82 and 86 and of the second smaller aforementioned diameter. As will presently be discussed, discontinuity 90 provides sleeve 74 with a capability for radial expansibility for registration of out-of tolerance plug 53 with its sleeve housing portion.

Figure 7:
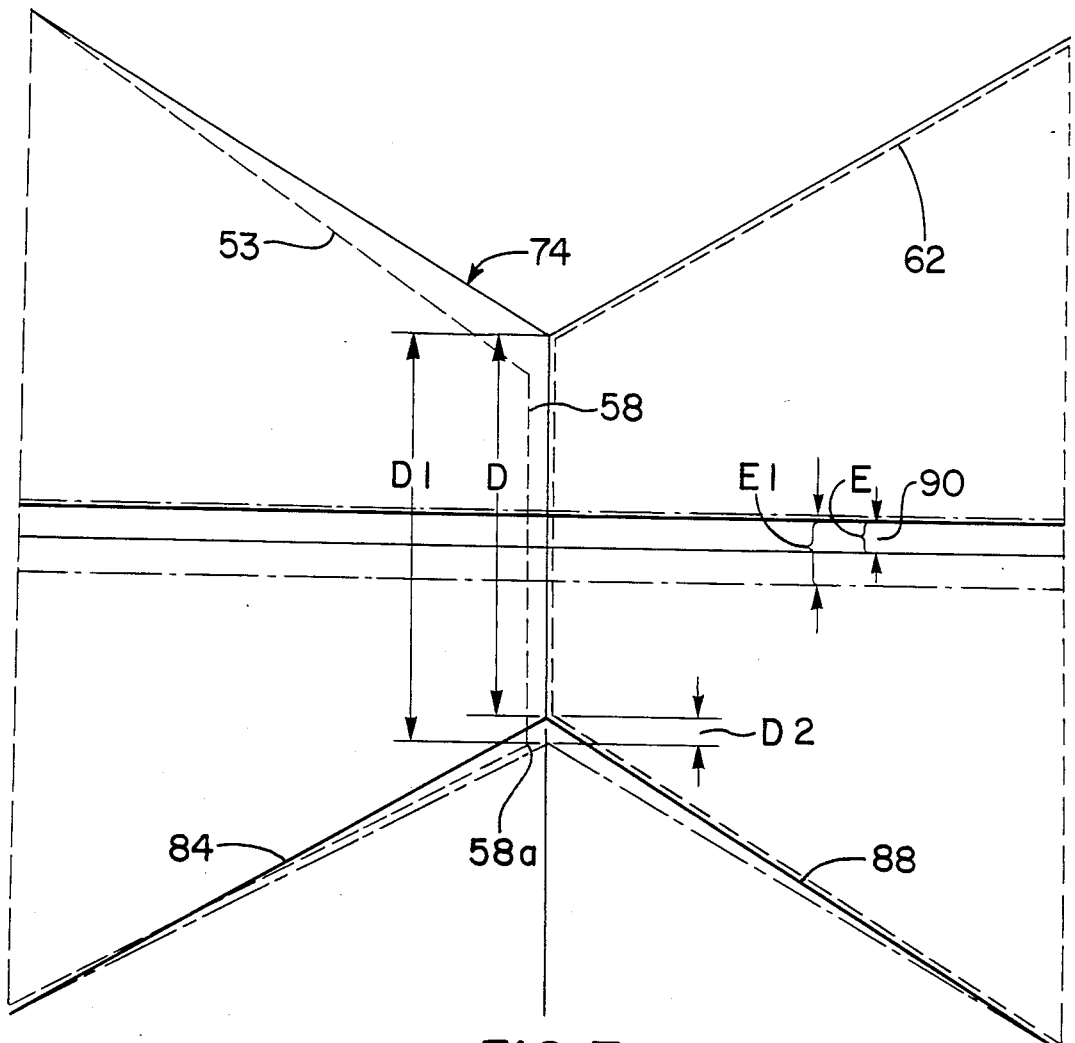
FIG. 7 is an enlarged schematic showing of the FIG. 1 right and left fiber plugs during transition seating thereof in the sleeve of FIG. 5.

Referring to FIG. 7, as margin 58a of smaller end 58 of plug 53 confronts frustro-conical surface 84, discontinuity 90 facilitates a radial distension of sleeve 74 adjacent interface 94, whereby margin 58a does not interfere with surface 84, in contrast to its interference with surface 22 as above discussed. The diameter dimension of interface 94 is transitionally enlarged from diameter D to diameter D1, corresponding to the distance D2 by which the interface need be enlarged to avoid such interfering fit as shown in FIG. 4. Discontinuity 90 thus increases transitionally in extent from E to E1.

Figure 8:
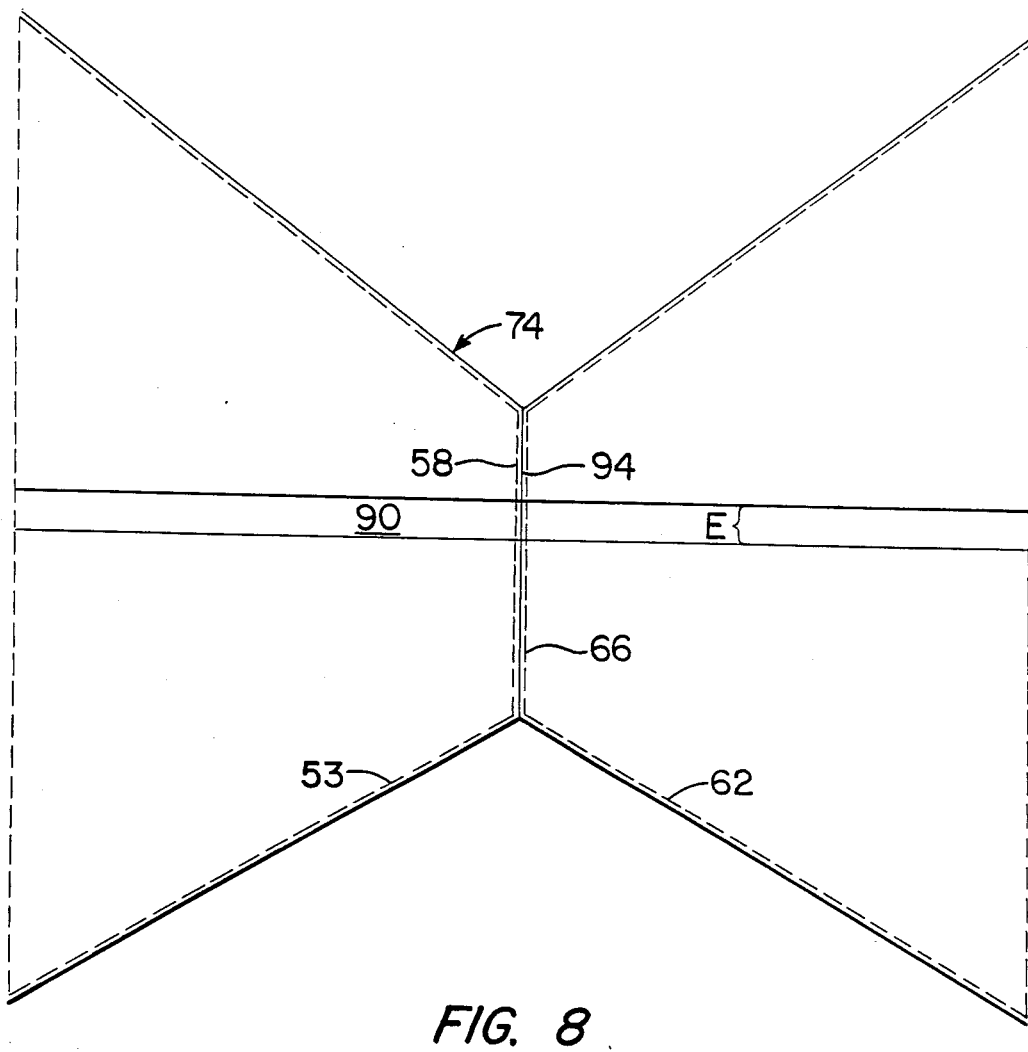
FIG. 8 is an enlarged schematic showing of the FIG. 1 right and left fiber plugs upon full seating thereof in the sleeve of FIG. 5.

Following the transitional shape change of sleeve 74 shown in FIG. 7, the situation matures to that shown in FIG. 8, i.e., end face 58 merges with interface 94 and discontinuity 90 returns, under natural constraint of its parent body, to extent E.

The sleeve of FIGS. 5 and 6, i.e., of type having a fully axially extending discontinuity without external bias, which evolved in the course of reaching the present invention, is not the subject of this patent application, the invention and is not claimed herein. The foregoing discussion of radial expansion and registration of out-of-tolerance will, however, be seen to have like applicability to connectors and housings of the invention.

Figure 10:
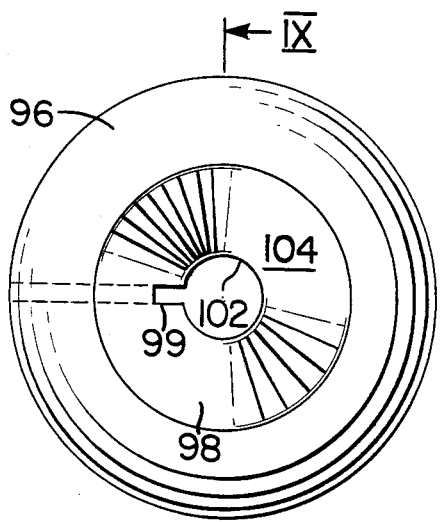
FIG. 10 is an elevation of the sleeve of FIG. 9 as would be seen from plane X—X of FIG. 9.
Figure 9:
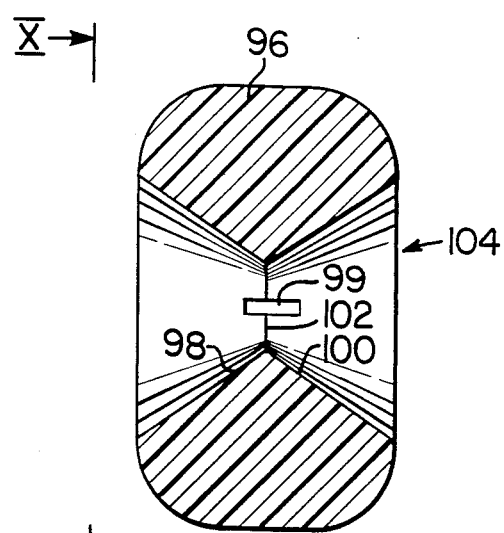
FIG. 9 is a central sectional view of a first sleeve structure in accordance with the present invention as would be seen from plane IX—IX of FIG. 10.

Turning now to FIGS. 9 and 10, a first version of structure in accordance with the invention comprises sleeve 96, having only a limited discontinuity 99 in its frustro-conical surfaces 98 and 100, having course encompassing connection interface 102 but not extending fully axially of passage 104. Thus, radial extension of passage 104 is acceptable, for purposes of the invention, if same provides for distension of passage 104 encompassing interface 102 sufficient to accomodate full axial movement of inserted plugs to interface 102. As will be seen, surfaces 98 and 100 have extents radially and axially successive to discontinuity 99 which are continuous and solid, as molded, and which provide, in effect, a self-bias within sleeve 96, applying radially inwardly directed force in opposition to such radial expansion of passage 104 adjacent interface 102, such force being of greater measure than exists in the case of the fully axially extending slot of FIGS. 5 and 6.

Figure 12:
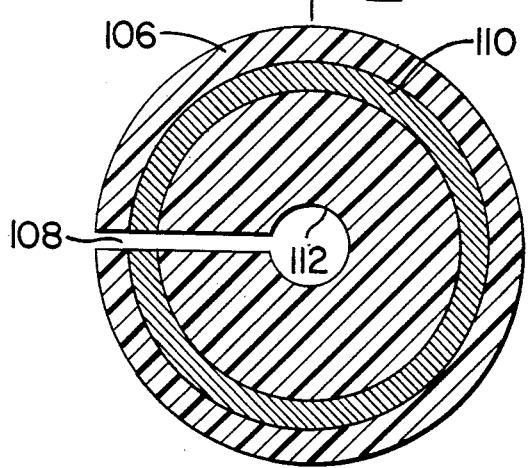
FIG. 12 is a sectional elevation of the sleeve of FIG. 11 as would be seen from interior plane XII—XII of FIG. 11.
Figure 11:
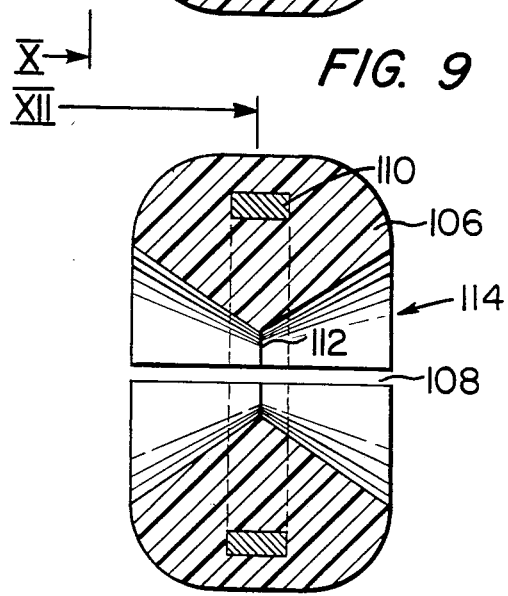
FIG. 11 is a central sectional view of a second sleeve structure in accordance with the present invention as would be seen from plane XI—XI of FIG. 12.

In the embodiment of the invention shown in FIGS. 11 and 12, sleeve 106 is shown with fully axially extending discontinuity 108 and embodies a C-shaped biasing means inthe form of spring 110, generally encompassing interface 112 of sleeve 106 to impose on sleeve 106 a radial interiorly directed force adapted to reinstate the dimension of discontinuity 108 after sleeve radial expansion, despite age relaxation of the material of sleeve 106. Discontinuity 108 may be fully axial in extent with passage 114, as shown, or of limited axial extent encompassing only interface 112.

Figure 14:
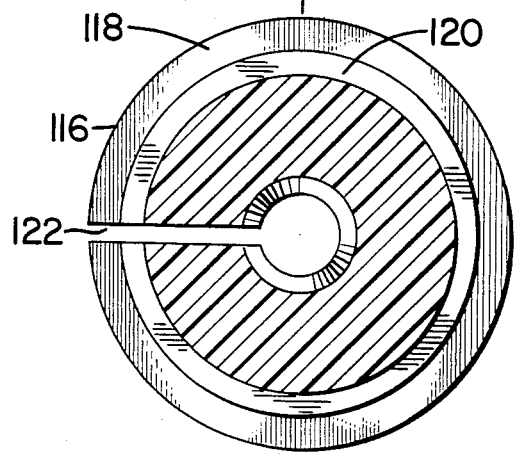
FIG. 14 is a sectional elevation of the sleeve of FIG. 13 as would be seen from interior plane XIV—XIV of FIG. 13.
Figure 13:
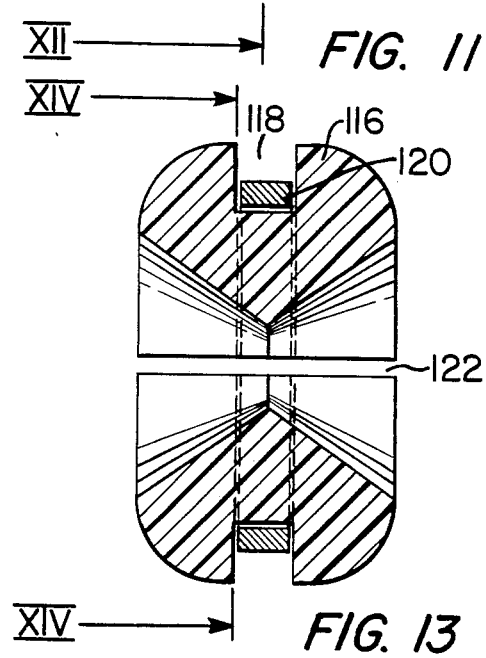
FIG. 13 is a central sectional view of a third sleeve structure in accordance with the present invention as would be seen from plane XIII—XIII of FIG. 14.

In the further embodiment of the invention shown in FIGS. 13 and 14, sleeve 116 has a radially extending centrally situated recess 118 for receipt of spring 120, shown in the form of a C-shaped member, insertable into recess 118, again for imposing external and independent radial constraint on the sleeve passage and discontinuity 122, here shown as being full axial extent.

Figure 15:
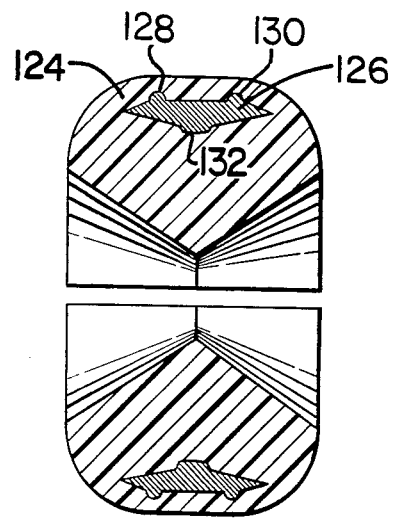
FIG. 15 is a central sectional view of a fourth sleeve structure in accordance with the present invention.

In FIG. 15, sleeve 124 is configured as in the case of the sleeve of FIGS. 11 and 12, i.e., integrally molded with a biasing means. Here, sleeve 124 includes C-shaped spring 126 having radially exteriorly extending members 128 and 130, mutually axially spaced, and radially interiorly extending member 132, which serve during molding to intimately anchor the parts of the molded assembly and to enhance coaction of the sleeve and the spring during use.

Figure 16:
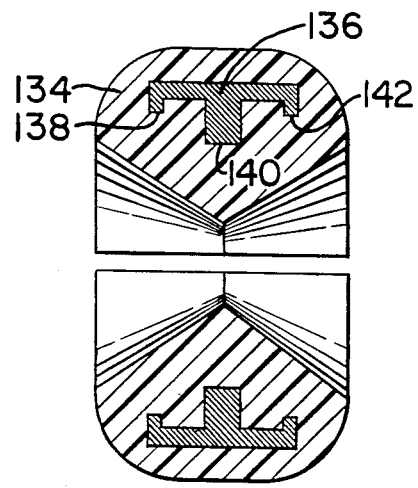
FIG. 16 is a central sectional view of a fifth sleeve structure in accordance with the present invention.

Turning to FIG. 16, sleeve 134 is likewise configured as in the case of the sleeve of FIGS. 11 and 12, i.e., also integrally molded with a biasing means. Here, sleeve 134 includes C-shaped spring 136 having radially interiorly extending members 138, 140 and 142, mutually axially spaced and serving function akin to anchoring members 128, 130 and 132 above discussed.

Figure 17:
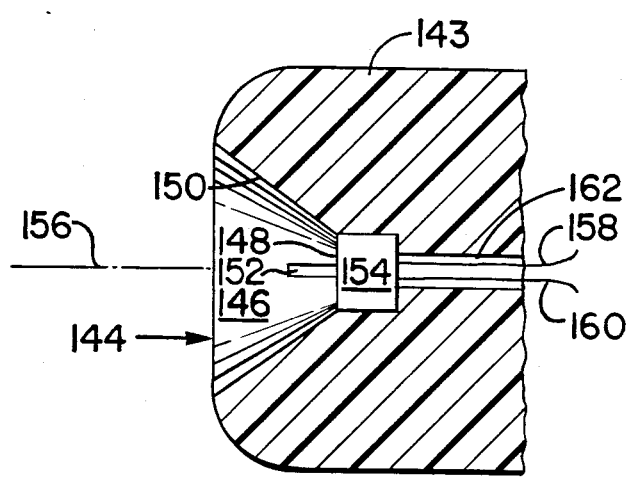
FIG. 17 is a central sectional view of an optical fiber-to-transducer termination device in accordance with the invention.

FIG. 17 illustrates a still further embodiment of the invention, wherein housing 143 has passage 144 with but a single portion 146, terminating at interface 148 and bounded by frustro-conical surface 150. Discontinuity 152 extends partially axially with passage 144, interiorly of its open end as shown. Housing 143 supports therein an active optical fiber terminator 154, e.g., a light-sensitive transducer, in contrast to the fiber-to-fiber termination of the previously discussed devices. Transducer 154 is aligned by housing 143 precisely with central axis 156 and the housing may define a channel 162 for passage of conductors 158 and 160 of transducer 154 to user apparatus, not shown. A fiber plug, such as plug 30 of FIG. 1 is introduced in passage 144 and is accomodated, by discontinuity 152 for full passage into registry with interface 148 to precisely register with transducer 154.

While radial expansibility of sleeves having one or more interior frustro-conical surfaces has been illustrated particularly by discontinuities therein, it may be more broadly observed that the invention encompasses diverse radially and axially successive extents adjacent the optical fiber connection interface, i.e., the smaller interior end of the frustro-conical surface. Viewing FIG. 9, one such extent is defined by slot 99, which is an open sleeve portion, and another such extent is defined by the presence of sleeve surface radially and axially continuous with the slot. Clearly, one may sufficiently weaken the sleeve selectively in the vicinity of the connection interface to achieve such radial expansion as required to provide full plug movement axially to the sleeve connection interface.

As will be seen, the invention provides optical fiber connector housing, optical fiber connectors and methods for optical fiber termination in its various aspects, as set forth in the ensuing claims. Various changes in structure and modifications in methodology may be introduced without departing from the invention. Accordingly, it will be understood that the particularly depicted embodiments and practices are intended in an illustrative and not in a limiting sense. The true spirit and scope of the invention is set forth in the following claims.

I claim:

1. An optical fiber connector comprising a housing having an axially extending passage with a first exterior opening of first diameter and a second interior opening of second diameter less than said first diameter and a frustro-conical wall bounding said passage, said wall having diverse radially and axially successive extents adjacent said second opening and therey having selective radial expansibility for facilitating seating of an optical fiber plug therein.

2. The connector claimed in claim 1 further including separate biasing means for opposing radial expansibility of said housing.

3. The connector claimed in claim 2 wherein said biasing means is disposed fully within said housing in partly encircling relation to said passage.

4. The connector claimed in claim 3 wherein said housing comprises a plastic body molded about said biasing means.

5. The connector claimed in claim 2 wherein said biasing means is disposed upon an exterior surface of said housing in partly encircling relation to said passage.

6. The connector claimed in claim 5 including a radially recessed portion bounded by said exterior surface upon which said biasing means is disposed.

7. The connector claimed in claim 1 wherein one of said diverse extents of said wall comprises a slot extending through said wall, the others of said diverse extents comprising sleeve portions continuous with said slot.

8. The connector claimed in claim 7 wherein said slot extends from said second opening to a location distal from said first opening.

9. An optical fiber connector comprising a housing having an axially extending passage with a first exterior opening of first diameter and a second interior opening of second diameter less than said first diameter and a frustro-conical wall bounding said passage, a plug having an end of said second diameter and a frustro-conical surface extending from said plug end to an intermediate location in said plug of said first diameter, said plug containing therein an optical fiber with a fiber end face registered centrally with said plug end, said wall having diverse radially and axially successive extents adjacent said second opening and thereby having selective radial expansibility for facilitating seating of said plug.

10. The connector claimed in claim 9 further including separate biasing means for opposing radial expansibility of said housing.

11. The connector claimed in claim 10 wherein said biasing means is disposed fully within said housing in partly encircling relation to said passage.

12. The connector claimed in claim 11 wherein said housing comprises a plastic body molded about said biasing means.

13. The connector claimed in claim 10 wherein said biasing means is disposed upon an exterior surface of said housing in partly encircling relation to said passage.

14. The connector claimed in claim 13 including a radially recessed portion bounded by said exterior surface upon which said biasing means is disposed.

15. The connector claimed in claim 9 wherein one of said diverse radial and axial extents of said wall comprises a slot extending through said wall, the others of said diverse radial and axial extents comprising sleeve portions continuous with said slot.

16. The connector claimed in claim 15 wherein said slot extends from said second opening to a location distal from said first opening.

17. An optical fiber connector housing having an axially extending passage with a first exterior opening of first diameter, a second interior opening of second diameter less than said first diameter and a third exterior opening of said first diameter, and a pair of frustro-conical walls bounding said passage and extending respectively from said first opening to said second opening and from said third opening to said second opening, each of said walls having diverse radially and axially successive extents adjacent said second opening and thereby having selective radial expansibility for facilitating seating of an optical fiber plug therein.

18. The housing claimed in claim 17 further including separate biasing means for opposing radial expansibility of said housing.

19. The housing claimed in claim 18 wherein said biasing means is disposed fully within said housing in partly encircling relation to said passage.

20. The housing claimed in claim 19 wherein said housing comprises a plastic body molded about said biasing means.

21. The housing claimed in claim 18 wherein said biasing means is disposed upon an exterior surface of said housing in partly encircling relation to said passage.

22. The housing claimed in claim 21 including a radially recessed portion bounded by said exterior surface upon which said biasing means is disposed.

23. The housing claimed in claim 17 wherein one of said diverse radial and axial extents of each said wall comprises a slot extending through said wall, the others of said diverse radial and axial extents comprising sleeve portions continuous with said slot.

24. The housing claimed in claim 23 wherein said slot extends from said second opening to locations respectively distal from said first and third openings.

25. An optical fiber connector comprising a housing having an axially extending passage with a first exterior opening of first diameter, a second interior opening of second diameter less than said first diameter and a third exterior opening of said first diameter, and a pair of frustro-conical walls bounding said passage and extending respectively from said first opening to said second opening and from said third opening to said second opening, and a pair of plugs, each plug having an end of said second diameter and a frustro-conical surface extending from said plug end to an intermediate location in said plug of said first diameter, each said plug containing therein an optical fiber with a fiber end face registered centrally with said plug end, each said wall having diverse radially and axially successive extents adjacent said second opening and thereby having selective radial expansibility for facilitating seating of said plugs.

26. An optical fiber connector comprising a housing having an axially extending passage with a first exterior opening of first diameter and a second interior opening of second diameter less than said first diameter and a frustro-conical wall bounding said passage, said wall having an opening extending fully axially thereof and thereby having selective radial expansibility for facilitating seating of an optical fiber plug therein, and separate resilient biasing means for opposing radial expansibility of said housing, said resilient biasing means being in generally encircling relation to said passage and in registry with said second diameter opening thereof.

27. The connector claimed in claim 26 wherein said biasing means is disposed fully within said housing.

28. The connector claimed in claim 27 wherein said housing comprises a plastic body molded about said biasing means.

29. The connector claimed in claim 26 wherein said biasing means is disposed upon an exterior surface of said housing.

30. The connector claimed in claim 29 including a radially recessed portion bounded by said exterior surface upon which said biasing means is disposed.

31. A method for optical fiber termination, comprising the steps of:
   (a) supporting an optical fiber in a housing and defining a frustro-conical exterior surface for said fiber housing having an end with which said fiber has an end face in registry;
   (b) defining a receptor housing for said fiber housiing having an opening for receipt of said fiber housing and a fiber termination interface with a frustro-conical interior surface extending from said opening to said interface;
   (c) working said receptor housing frustro-conical surface to provide said housing with a capacity for radial expansion sufficient to permit full axial movement of said fiber housing end to register with said receptor housing interface despite configurational disparities between said exterior and interior frustro-conical surfaces; and
   (d) effecting generally encircling radial bias to said receptor housing in opposition to such radial expansion thereof by applying a resilient member thereto.

32. The method claimed in claim 31 wherein said step (c) is practiced by forming a slot extending axially with said receptor housing and through said interior frustro-conical surface.

33. The method claimed in claim 32 wherein said step (c) is practiced by forming said slot fully axially coextensive with said receptor housing.

34. The method claimed in claim 32 wherein said step (c) is practiced by forming said slot through said interface with a slot end distal from said receptor housing opening.

* * * * *